(12) United States Patent
Yadav et al.

(10) Patent No.: US 12,483,901 B2
(45) Date of Patent: Nov. 25, 2025

(54) FIELD SURVEY DATA PRELOAD AND SYNCHRONIZATION FOR THIRD-PARTY SYSTEMS

(71) Applicant: RAKUTEN SYMPHONY, INC., Tokyo (JP)

(72) Inventors: Praveen N Yadav, Indore (IN); Piyush Patel, Indore (IN); Harsh Mathur, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/001,711

(22) PCT Filed: Sep. 23, 2022

(86) PCT No.: PCT/US2022/044483
§ 371 (c)(1),
(2) Date: Dec. 13, 2022

(87) PCT Pub. No.: WO2024/063780
PCT Pub. Date: Mar. 28, 2024

(65) Prior Publication Data
US 2024/0267746 A1 Aug. 8, 2024

(51) Int. Cl.
*H04W 16/18* (2009.01)
*G06F 21/64* (2013.01)
(52) U.S. Cl.
CPC ............ *H04W 16/18* (2013.01); *G06F 21/64* (2013.01)
(58) Field of Classification Search
CPC ................................ H04W 16/18; G06F 21/64

USPC ......................................................... 455/418
See application file for complete search history.

(56) References Cited

U.S. PATENT DOCUMENTS

| 10,986,509 | B1* | 4/2021 | Lois ...................... H04W 16/22 |
| 2005/0059406 | A1* | 3/2005 | Thomson .............. H04W 16/00 455/446 |
| 2009/0081956 | A1* | 3/2009 | Liechty ................. H04W 24/00 455/67.11 |

FOREIGN PATENT DOCUMENTS

JP        2014107639 A       6/2014

OTHER PUBLICATIONS

Ekahau Inc: "Ekahau RTLS with Ekahau Site Survey", May 23, 2021 (May 23, 2021), pp. 1-71, XP093306498, Retrieved from the Internet <URL:https://ia804501.us.archive.org/6/items/manualzillaid-6868801/6868801.pdf>, 71pp.

* cited by examiner

Primary Examiner — Rasha S Al Aubaidi
Assistant Examiner — Jirapon Tulop
(74) Attorney, Agent, or Firm — HAUPTMAN HAM, LLP (57) ABSTRACT

A method includes receiving node-site planning data from a first-party application; validating the node-site planning data based on one or more parameters of validation; pre-loading at least a portion of the node-site planning data on a second-party application for field-survey data gathering; and receiving field-survey data from the second-party application.

20 Claims, 5 Drawing Sheets

FIELD SURVEY DATA PRELOAD AND SYNCHRONIZATION FOR THIRD-PARTY SYSTEMS

RELATED APPLICATIONS

The present application is a National Phase of International Application No. PCT/US2022/044483, filed Sep. 23, 2022.

TECHNICAL FIELD

This description relates to a system for field survey data preload and synchronization for third-party systems and method of using the same.

BACKGROUND

A cellular network is a telecommunication system of mobile devices (e.g., mobile phone devices) that communicate by radio waves through one or more local antenna at a cellular base station (e.g., cell tower). The coverage area in which service is provided is divided into small geographical areas called cells. Each cell is served by a separate low-power-multichannel transceiver and antenna at the cell tower. Mobile devices within a cell communicate through that cell's antenna on multiple frequencies and on separate frequency channels assigned by the base station from a common pool of frequencies used by the cellular network.

A radio access network (RAN) is part of the telecommunication system and implements radio access technology. RANs reside between a device such as a mobile phone, a computer, or remotely controlled machine and provides connection with a core network (CN). Depending on the standard, mobile phones and other wireless connected devices are varyingly known as user equipment (UE), terminal equipment (TE), mobile station (MS), and the like.

SUMMARY

In some embodiments, a method includes receiving node-site planning data from a first-party application; validating the node-site planning data based on one or more parameters of validation; pre-loading at least a portion of the node-site planning data on a second-party application for field-survey data gathering; and receiving field-survey data from the second-party application.

In some embodiments, an apparatus, includes a processor; and a memory having instructions stored thereon that, when executed by the processor, cause the processor to receive node-site planning data from a first-party application; validate the node-site planning data based on one or more parameters of validation; pre-load at least a portion of the node-site planning data on a second-party application for field-survey data gathering; and receive field-survey data from the second-party application.

In some embodiments, a non-transitory computer readable medium having instructions stored thereon that, when executed by a processor, cause the processor to receive node-site planning data from a first-party application; validate the node-site planning data based on one or more parameters of validation; pre-load at least a portion of the node-site planning data on a second-party application for field-survey data gathering; and receive field-survey data from the second-party application.

BRIEF DESCRIPTION OF THE DRAWINGS

Aspects of the present disclosure are understood from the following detailed description when read with the accompanying FIGS. In accordance with the standard practice in the industry, various features are not drawn to scale. In some embodiments, dimensions of the various features are arbitrarily increased or reduced for clarity of discussion.

DETAILED DESCRIPTION

The following disclosure provides many different embodiments, or examples, for implementing distinctive features of the discussed subject matter. Examples of components, values, operations, materials, arrangements, or the like, are described below to simplify the present disclosure. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the numerous examples. This repetition is for the purpose of simplicity and clarity and is unintended to dictate a relationship between the various embodiments and/or configurations discussed.

Further, spatially relative terms, such as beneath, below, lower, above, upper and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a FSDPS system to maintain data integrity through automated field survey data preload and synchronization (FSDPS) between third-party systems is discussed in embodiments of the present disclosure.

A wireless site survey, sometimes called an RF (Radio Frequency) site survey, field survey, or wireless survey, is the process of planning and designing a wireless network, to provide a wireless solution that delivers the required wireless coverage, data rates, network capacity, roaming capability, and quality of service (QoS). The survey usually involves a site visit to test for RF interference, identify optimum installation locations for access points, analysis of building floor plans, inspection of a facility, and use of site survey tools. Interviews with information technology (IT) management and the end users of the wireless network are also used to determine the design parameters for the wireless network.

In other approaches, no methodology existed to preload data from third-party systems with varying configurations and compatibility. In other approaches, data synchronization was performed manually using spreadsheet import or manual entry. In other approaches, data synchronization between different systems with different architectures was performed manually with a spreadsheet, was user unfriendly, and unreliable.

In some embodiments, a field survey data preload and synchronization (FSDPS) system, discussed in the various embodiments throughout, directly preloads and populates survey data in third-party tools, which reduces or eliminates incorrect manual data insertion risk by a user and reduces time taken to manually enter data. In some embodiments, the FSDPS system maintains the data state and integrity between different systems owned by different companies. In some embodiments, an algorithm fetches the survey data from a first system and parses the data in multiple parts, which updates data throughout multiple third-party systems.

In a non-limiting example, the FSDPS system fetches data from party one's system, stores the data in the FSDPS system, fetches data from party two's system, and simultaneously updates at least a portion of related data in party three's system.

In other approaches, a field engineer entered data manually in a field survey application (e.g., Spectra Pro App (a.k.a. CPI)) and the information is sent from the field survey application to a wireless network system. In some embodiments, to overcome risk of incorrect manual data input into the field survey application (e.g., field engineers periodically send field site data that is related to an incorrect site due to manual error), preloading is applied between a wireless network system and the field survey application.

In some embodiments, data is preloaded into a FSDPS system owned by a different organization (not the originator of the data), substantially eliminating manual entry errors. In some embodiments, after preloading, at least a portion of the data updates a field survey application with parameter data, such as latitude and longitude of the site, site identification (ID), address. A user enters data for the remaining parameters such as antenna details, photographs of the actual sites, and other suitable parameters within the scope of embodiments. In some embodiments, after the data is verified as correct by the FSDPS system, third parties using the data are updated.

In some embodiments, manual data entry is limited, an automated process makes for efficient data sharing, and upon a successful data request the data updated in multiple systems. In some embodiments, the FSDPS system automatically schedules a trigger (e.g., every eleven hours) for each data request from a field survey application (e.g., CPI). In some embodiments, based on a data availability request, the FSDPS system updates the data from one party to multiple parties.

In some embodiments, data is entered into a centralized database (DB) and shared with other parties. In some embodiments, the FSDPS system requests the site planning data from the a site planner. This communication is secured with a session token. In response to the session token being incorrect then communication is unable to be established. In response to the session token being correct then the FSDPS system receives an extensible markup language (XML) file from the centralized database in which site details are available. In some embodiments, to create a site in the FSDPS system, the XML is parsed, and data is retrieved from the centralized DB.

In some embodiments, in response to a site being created in the FSDPS system, data is preloaded to a field-survey application (e.g., Spectra a third-party system). This preloaded data is used by a field engineer to complete a survey of desired sites. Preloaded data saves the field engineer time and reduces the risk of data corruption or incorrect data input. In some embodiments, after the field survey is finished, the field survey application synchronizes data back to the FSDPS system. The FSDPS system updates the initial survey site planning data with the final data coming from the field survey application. In some embodiments, the same data is updated in the centralized DB to maintain data integrity between each party in the FSDPS system.

Figure 1:
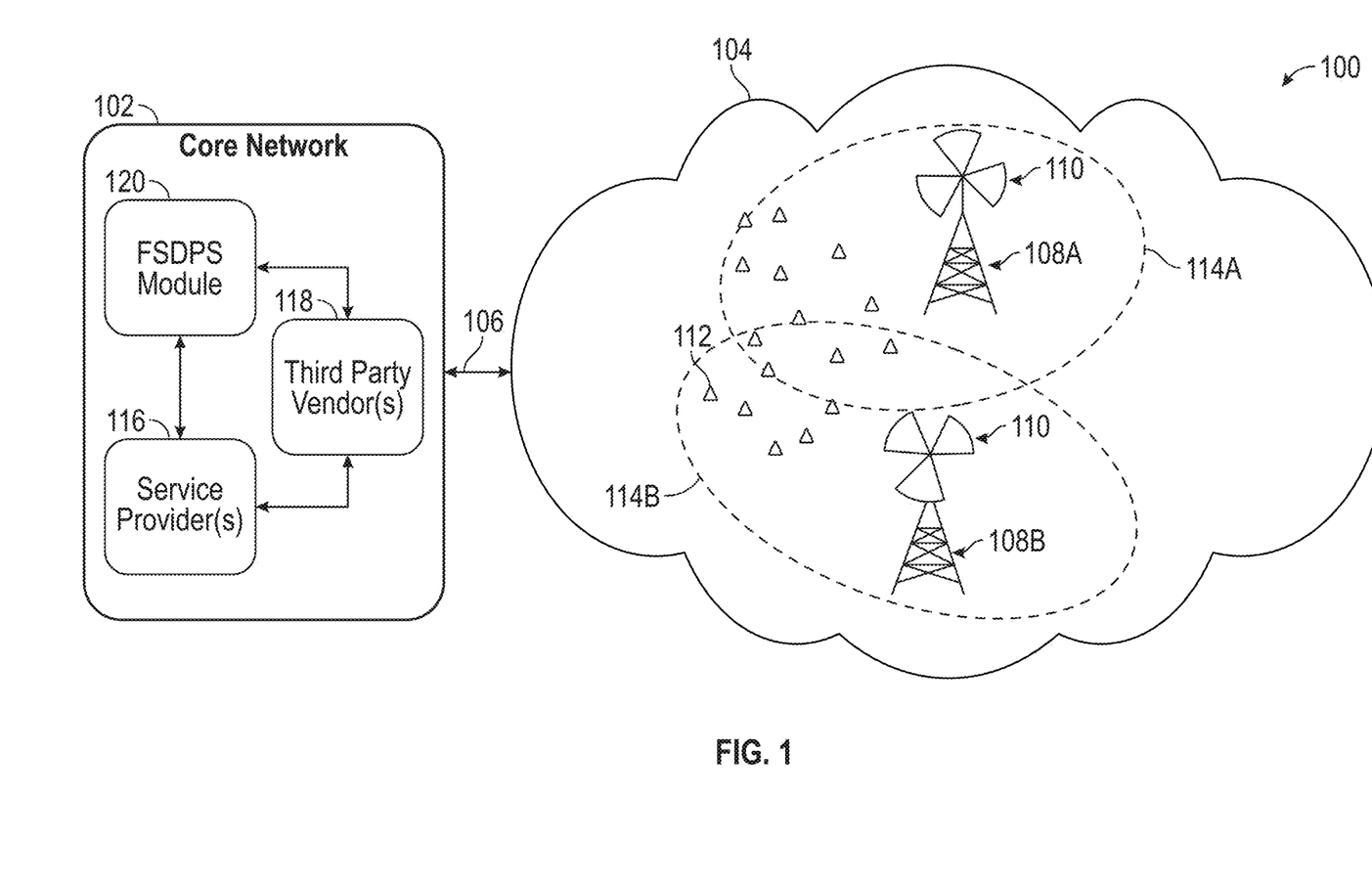
FIG. 1 is a diagrammatic representation of a system for field survey data preload and synchronization (FSDPS), in accordance with some embodiments

FIG. 1 is a diagrammatic representation of a system for field survey data preload and synchronization (FSDPS) 100, in accordance with some embodiments.

FSDPS system 100 includes a CN 102 communicatively connected to RAN 104 through transport network (TN) 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, third-party vendors 118, and FSDPS module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between UE 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, TN 106 of FSDPS system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with TN 106 connected to CN 102. In some embodiments, TN 106 includes wired, fiber optic, and wireless components. Wireless sections include using microwave bands, mesh, and edge network topologies that use high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, base stations are replaced with other edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 422 (FIG. 4), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In some embodiments, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e., mountains) and buildings, technology, radio frequency and most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal.

Service provider(s) 116 are businesses, vendors, customers, or organizations that sell bandwidth or network access to subscribers (utilizing UEs) by providing direct Internet backbone access to Internet service providers and usually access to network access points (NAPs). Service providers are sometimes referred to as backbone providers, Internet providers, or vendors. Service providers include telecommunications companies, data carriers, wireless communications providers, Internet service providers, and cable television operators offering high-speed Internet access.

Service provider(s) 116 often use radio access network planning (RAN Planning) to propose site locations (e.g., base stations, edge devices, or any other communication device within the scope of embodiments herein), configurations, and settings of new network nodes (either a redistribution point or a communication endpoint) to be rolled out in a wireless network. The general objectives of radio network planning are obtaining sufficient coverage over target area, ensuring satisfactory service quality and low bit-error rates, providing the demanded network capacity with low service blocking, satisfactory user throughputs and low dropped call rates, implementing an economically efficient network infrastructure (i.e. minimum number of sites and transmitters required to satisfy coverage, quality and capacity requirements).

These radio network planning objectives are fulfilled by proper selection of site locations and configuration of cell settings and parameters, including antenna models, antenna heights, azimuth, and tilt angles, and other suitable equipment and parameters within the scope of embodiments. Site selection and configuration is useful, as the number of cells to be deployed in urban areas is much higher than for previous wireless technologies.

Next steps of the RAN planning process include specification of technology-dependent parameters. Deriving neighbor lists for new sites is also part of the RAN Planning process. Other numerous standardized and vendor-specific parameters are typically set at nominal values at rollout and continuously tuned when cells are operational and key performance indicators (KPIs) become available. Efficient RAN planning is reflected in satisfied subscribers, low infrastructure cost, and lower optimization efforts following the network rollout.

Third party vendor(s) 118 is any an enterprise that contributes goods or services to FSDPS system 100. Generally, a supply chain vendor manufactures inventory/stock items and sells them to the next link in the chain. In some embodiments, vendors are those entities providing field survey data. In some embodiments, a vendor is a networking device manufacturer. In some embodiments, a vendor is an entity providing site planning data.

In some embodiments, FSDPS module 120 is configured to preload and synchronize data to and from in third-party systems for a field survey and to maintain the data integrity through automation. In some embodiments, FSDPS module 120 maintains the data state and integrity between different systems owned by the different companies, such as service provider(s) 116. In some embodiments, an FSDPS algorithm fetches the survey data from a first system and parses the data in multiple parts, which updates data throughout multiple third-party systems. In some embodiments, FSDPS module 120 fetches site planning data from a first party's system, stores the data a centralized DB, fetches field survey data from a second party's system, and simultaneously updates at least a portion of related data in a third party's system.

Figure 2:
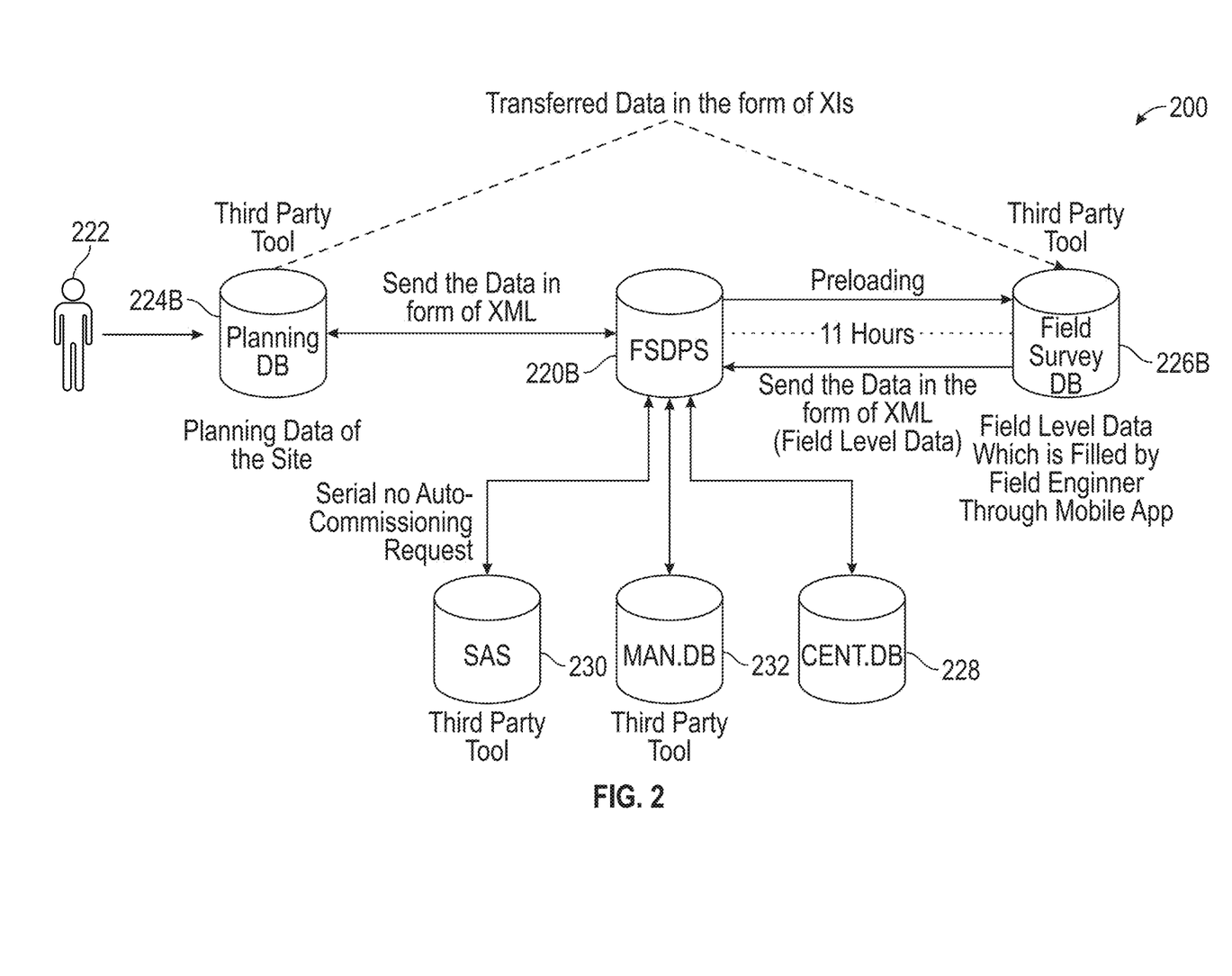
FIG. 2 is a block diagram of FSDPS system, in accordance with some embodiments.

FIG. 2 is a block diagram of FSDPS system 200, in accordance with some embodiments.

Figure 3:
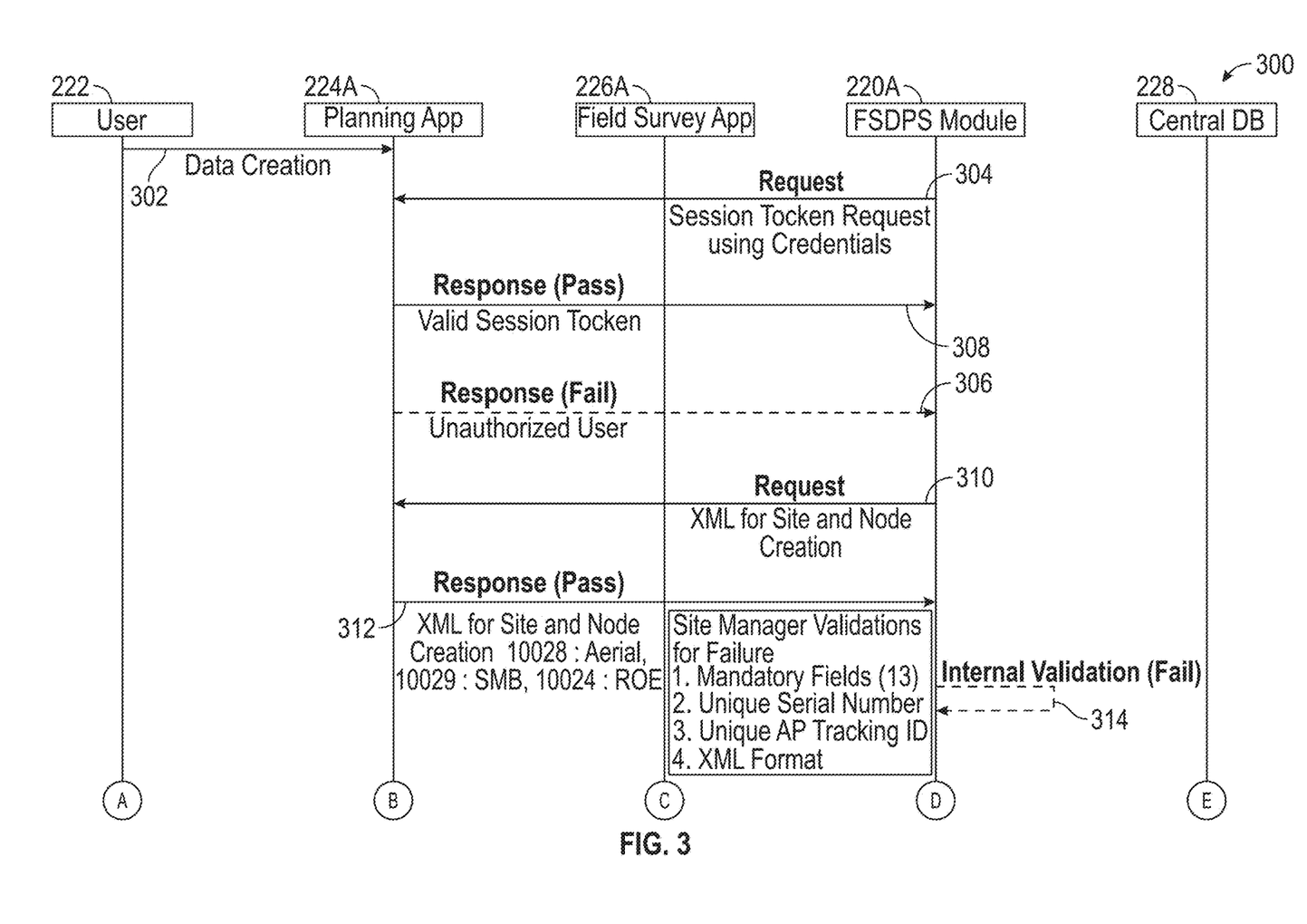
FIG. 3 is a data flow diagram for a method of preloading and synchronizing field survey data, in accordance with some embodiments.

FIG. 3 is a data flow diagram for a method of preloading and synchronizing field survey data (PSFSD) 300, in accordance with some embodiments.

In some embodiments, FSDPS 200 is like FSDPS 100. In some embodiments, PSFSD method 300 describes process tasks of preloading and synchronizing planning and field survey data. While the operations of PSFSD method 300 are discussed and shown as having a particular order, each operation in PSFSD method 300 is configured to be performed in any order unless specifically called out otherwise. PSFSD method 300 is implemented as a set of operations, such as operations 302 through 330. Further, PSFSD method 300 is discussed with reference to FIGS. 2-3 to assist in the understanding of PSFSD method 300.

At operation 302 of PSFSD method 300, site planning data is created (or uploaded). In FIG. 2, user 222 creates the site planning data with planning application 224A (FIG. 3). After site planning data creation, the site planning data is available in site planning DB 224B. In some embodiments, user 222 is an agent for a service provider, such as one or more of service provider(s) 116. Planning application 224A includes a site planning DB 224B where site planning data is stored locally. In some embodiments, planning application 224A and planning DB 224B are located separately. Process flows from operation 302 to operation 304.

At operation 304 of PSFSD method 300, FSDPS module 220A sends a session token request using credentials to planning application 224A. In computer science, a session identifier, session ID or session token is a piece of data that is used in network communications (often over hypertext transfer protocol (HTTP)) to identify a session, a series of related message exchanges. Session tokens are configured to be used in cases where the communications infrastructure uses a stateless protocol such as HTTP. A session token is typically granted to a visitor on their first visit to a site. A session token is different from a user ID in that sessions are typically short-lived (they expire after a preset time of inactivity which is minutes or hours) and become invalid after a certain goal has been met as session tokens are often used to identify a user that has logged into a website. A session token is usually a randomly generated string to decrease the probability of obtaining a valid one by means of a brute-force search. In some embodiments, FSDPS module 220A is similar to FSDPS 120. Process flows from operation 304 to operation 306 or operation 308.

At operation 306 of PSFSD method 300, in response to the session token being incorrect, then a fail response is sent to FSDPS module 220A and no communication is established. In the event of a failed response, operations of method 300 end at operation 306.

At operation 308 of PSFSD method 300, in response to the session token passing, then a pass response is sent to FSDPS module 220A and communication is established. Process flows from operation 308 to operation 310.

At operation 310 of PSFSD method 300, FSDPS module 220A requests site planning data from planning application 224B. In some embodiments, the request is for XML data for site and node creation. Process flows from operation 310 to operation 312.

At operation 312 of PSFSD method 300, FSDPS module 220A receives an XML file from planning app 224B in which site details are available. In some embodiments, planning application 224A provides 196 data parameters to FSDPS module 220A in XML form for each site planned. In some embodiments, FSDPS module 220A stores the planning XML file in FSDPS 220B. Process flows from operation 312 to operation 314 or operation 316.

At operation 314 of PSFSD method 300, an internal validation fails. In some embodiments, a site manager (not shown) performs validations for failure on the received planning data from planning application 224A. In some embodiments, the site manager determines whether one or more mandatory fields within the XML data include data. In some embodiments, the site manager determines whether a unique serial number is within the data. In some embodiments, the site manager determines whether a unique application tracking ID exists. In some embodiments, the site manager verifies the data is in XML format. In some embodiments, the site manager requires one or more of the validations above to validate the data. In response to the data being unverified by the site manager, process flows to operation 318 where a failure notification is sent to user 222. In some embodiments, the failure notification is an email notification with a reason explaining why the site or node was uncreated. Method 300 then ends at operation 318.

At operation 316 of PSFSD method 300, an internal validation passes. In some embodiments, the XML planning data is used to create a site in FSDPS module 220A. In some embodiments, a site and node are created by the site manager with successful parsing of XML from planning application 224A. Process flows from operation 316 to operation 320.

At operation 320 of PSFSD method 300, in response to the site and node being created in FSDPS module 220A, FSDPS module 220A preloads the same planning data to field survey application 226A. In some embodiments, the preloaded planning data is stored in field survey DB 226B (FIG. 2). This preloaded data is used by a field engineer to complete one or more surveys of planned sites. Preloaded data saves the field engineer time and reduces the risk of data corruption or wrong data input as at least a portion of the field survey information is already within field survey application 226A.

At operation 322 of PSFSD method 300, FSDPS module 220A stores the site and node fields in central database 228 to maintain data integrity between all parties involved, such as planning application 224A, FSDPS module 220A, and field survey application 226A. Process flows from operation 322 to operation 324.

At operation 324 of PSFSD method 300, in response to the field survey being completed, using field survey application 226A, field survey data is sent to and synchronized with FSDPS module 220A. In some embodiments, field survey application 226A sends a trigger when powered up in the field. In some embodiments, the field survey data is in XML format. In some embodiments, a trigger is automatically scheduled after eleven hours for the data request from field survey application 226A. Process flows from operation 324 to operation 326 or 330.

At operation 326 of PSFSD method 300, another internal validation of the field survey data is performed by FSDPS module 220A. In some embodiments, a site manager (not shown) performs validations for failure on the received field survey data from field survey application 226A. In some embodiments, the site manager determines whether one or more mandatory fields within the XML data include data. In some embodiments, the site manager determines whether a unique serial number is within the data. In some embodiments, the site manager determines whether a unique application tracking ID exists. In some embodiments, the site manager verifies the data is in XML format. In some embodiments, the site manager requires one or more of the validations above to validate the data. In response to the data being unverified by the site manager, process flows to operation 328 where a failure notification is sent to user 222. In some embodiments, the failure notification is an email notification with a reason explaining why the site or node was uncreated. Method 300 then ends at operation 318.

At operation 330 of PSFSD method 300, in response to the field survey data being validated, FSDPS module 220A updates the planning data with the field survey data from field survey application 226A. In some embodiments, the planning data is updated in planning application 224A and/or planning DB 224B to maintain data integrity within FSDPS system 200.

In some embodiments, the planning/field survey data is obtained by other third parties, such as a spectrum access system (SAS) DB 230 and a manufacturers DB 232.

In some embodiments, the SAS DB 230 communicates with FSDPS module 220A to determine whether sites and nodes are in compliance with citizens broadband radio service (CBRS). SAS is a cloud-based service that manages the wireless communications of devices transmitting in the CBRS band (a 150 MHz wide broadcast band located in the 3550-3700 MHz band), to prevent harmful interference to higher priority users. SAS is an automated radio spectrum coordinator responsible for assigning spectrum channels and their associated transmit power to CBRS service devices (CBSDs). CBSDs need authorization from the SAS before they can start to transmit in the CBRS band. SAS uses information provided by Environmental Sensing Capability (ESC) sensors to manage the spectrum and ensure that FCC rules are always enforced while giving maximum commercial access to available spectrum.

In some embodiments, manufacturers DB 232 communicates with FSDPS module 220A and/or FSDPS DB 220B to obtain data from devices being monitored in the field. Thus, vendors who manufacture the devices for networking are able to monitor how the devices are performing through field survey data.

Figure 4:
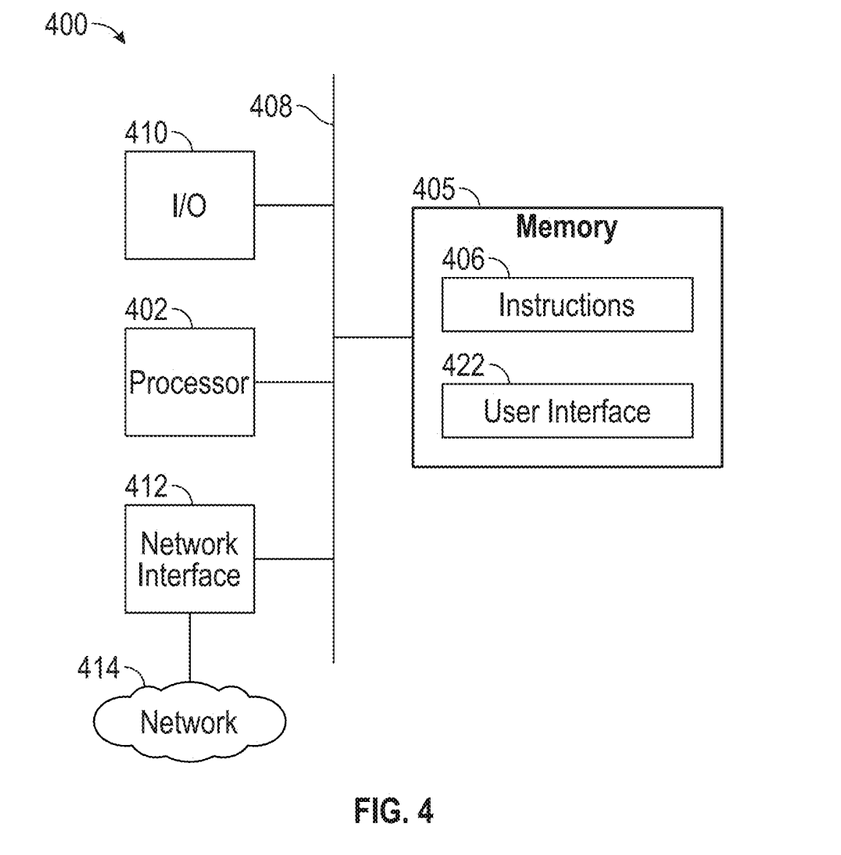
FIG. 4 is a high-level functional block diagram of a processor-based system, in accordance with some embodiments.

FIG. 4 is a block diagram of field survey data preloading and synchronization (FSDPS) processing circuitry 400 in accordance with some embodiments. In some embodiments, FSDPS processing circuitry 400 is a general-purpose computing device including a hardware processor 402 and a non-transitory, computer-readable storage medium 404. Storage medium 404, amongst other things, is encoded with, i.e., stores, computer program code 406, i.e., a set of executable instructions such as an algorithm, or method 300. Execution of instructions 406 by hardware processor 402 represents (at least in part) a preloading and synchronization of field survey data application which implements a portion, or all the methods described herein in accordance with one or more embodiments (hereinafter, the noted processes and/or methods).

Processor 402 is electrically coupled to a computer-readable storage medium 404 via a bus 408. Processor 402 is further electrically coupled to an I/O interface 410 by bus 408. A network interface 412 is further electrically connected to processor 402 via bus 408. Network interface 412 is connected to a network 414, so that processor 402 and computer-readable storage medium 404 connect to external elements via network 414. Processor 402 is configured to execute computer program code 406 encoded in computer-readable storage medium 404 to cause FSDPS processing circuitry 400 to be usable for performing a portion or all the noted processes and/or methods. In one or more embodiments, processor 402 is a central processing unit (CPU), a multi-processor, a distributed processing system, an application specific integrated circuit (ASIC), and/or a suitable processing unit.

In one or more embodiments, computer-readable storage medium 404 is an electronic, magnetic, optical, electromagnetic, infrared, and/or a semiconductor system (or apparatus or device). For example, computer-readable storage medium 404 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 404 includes a compact disk-read only memory (CD-ROM), a compact disk-read/write (CD-R/W), and/or a digital video disc (DVD).

In one or more embodiments, storage medium 404 stores computer program code 406 configured to cause FSDPS processing circuitry 400 to be usable for performing a portion or all the noted processes and/or methods. In one or more embodiments, storage medium 404 further stores information, such as an algorithm which facilitates performing a portion or all the noted processes and/or methods.

FSDPS processing circuitry 400 includes I/O interface 410. I/O interface 410 is coupled to external circuitry. In one or more embodiments, I/O interface 410 includes a keyboard, keypad, mouse, trackball, trackpad, touchscreen, and/or cursor direction keys for communicating information and commands to processor 402.

FSDPS processing circuitry 400 further includes network interface 412 coupled to processor 402. Network interface 412 allows FSDPS processing circuitry 400 to communicate with network 414, to which one or more other computer systems are connected. Network interface 412 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more FSDPS processing circuitry 400.

FSDPS processing circuitry 400 is configured to receive information through I/O interface 410. The information received through I/O interface 410 includes one or more of instructions, data, design rules, and/or other parameters for processing by processor 402. The information is transferred to processor 402 via bus 408. FSDPS processing circuitry 400 is configured to receive information related to UI 422 through I/O interface 410. The information is stored in computer-readable medium 404 as user interface (UI) 422.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a method includes receiving node-site planning data from a first-party application; validating the node-site planning data based on one or more parameters of validation; pre-loading at least a portion of the node-site planning data on a second-party application for field-survey data gathering; and receiving field-survey data from the second-party application.

In some embodiments, the method further includes creating a node-site based on the node-site planning data; and storing the node-site or the node-site planning data in a centralized database.

In some embodiments, the method further includes validating the field-survey data from the second-party application based on the one or more parameters of validation.

In some embodiments, the method further includes, in response to a failed validation of the field-survey data, sending communication to a first-party that describes the failed validation.

In some embodiments, the method further includes, in response to a successful validation of the field-survey data, sending an update of the node-site planning data to the first-party application, the node-site planning data being updated based upon the received field-survey data.

In some embodiments, the method further includes, before the receiving of the node-site planning data from the first-party application; sending a session-token request to the first party application.

In some embodiments, the method further includes receiving a valid token response from the first-party application; or receiving an invalid token response from the first-party application.

In some embodiments, the method further includes, in response to the receiving the valid token response from the first-party application, sending a request for the node-site planning data from the first-party application.

In some embodiments, an apparatus, includes a processor; and a memory having instructions stored thereon that, when executed by the processor, cause the processor to receive node-site planning data from a first-party application; validate the node-site planning data based on one or more parameters of validation; pre-load at least a portion of the node-site planning data on a second-party application for field-survey data gathering; and receive field-survey data from the second-party application.

In some embodiments, the instructions further cause the processor to create a node-site based on the node-site planning data; and store the node-site or the node-site planning data in a centralized database.

In some embodiments, the instructions further cause the processor to validate the field-survey data from the second-party application based on the one or more parameters of validation.

In some embodiments, the instructions further cause the processor to, in response to a failed validation of the field-survey data, send communication to a first-party that describes the failed validation.

In some embodiments, the instructions further cause the processor to, in response to a successful validation of the field-survey data, send an update of the node-site planning data to the first-party application, the node-site planning data being updated based upon the received field-survey data.

In some embodiments, the instructions further cause the processor to, before the receiving of the node-site planning data from the first-party application; send a session-token request to the first party application.

In some embodiments, the instructions further cause the processor to receive a valid token response from the first-party application; or receive an invalid token response from the first-party application.

In some embodiments, the instructions further cause the processor to, in response to the receiving the valid token response from the first-party application, send a request for the node-site planning data from the first-party application.

In some embodiments, a non-transitory computer readable medium having instructions stored thereon that, when executed by a processor, cause the processor to receive node-site planning data from a first-party application; validate the node-site planning data based on one or more parameters of validation; pre-load at least a portion of the node-site planning data on a second-party application for field-survey data gathering; and receive field-survey data from the second-party application.

In some embodiments, the instructions further cause the processor to create a node-site based on the node-site planning data; and store the node-site or the node-site planning data in a centralized database.

In some embodiments, the instructions further cause the processor to validate the field-survey data from the second-party application based on the one or more parameters of validation.

In some embodiments, the instructions further cause the processor to, in response to a failed validation of the field-survey data, send communication to a first-party that describes the failed validation.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method comprising:
   receiving node-site planning data from a first-party application;
   validating the node-site planning data based on one or more parameters of validation;
   pre-loading at least a portion of the node-site planning data on a second-party application for field-survey data gathering;
   receiving field-survey data from the second-party application;

synchronizing at least a portion of the node-site planning data from the first-party application with the field-survey data from the second-party application; and storing synchronized data in a centralized database.

2. The method of claim 1, further comprising:

creating a node-site based on the node-site planning data; and storing the node-site or the node-site planning data in the centralized database.

3. The method of claim 1, further comprising:

validating the field-survey data from the second-party application based on the one or more parameters of validation.

4. The method of claim 3, further comprising:

in response to a failed validation of the field-survey data, sending communication to a first-party that describes the failed validation.

5. The method of claim 3, further comprising:

in response to a successful validation of the field-survey data, sending an update of the node-site planning data to the first-party application, the node-site planning data being updated based upon the received field-survey data.

6. The method of claim 1, further comprising:

before the receiving of the node-site planning data from the first-party application;

sending a session-token request to the first party application.

7. The method of claim 6, further comprising:

receiving a valid token response from the first-party application; or receiving an invalid token response from the first-party application.

8. The method of claim 7, further comprising:

in response to the receiving the valid token response from the first-party application, sending a request for the node-site planning data from the first-party application.

9. An apparatus, comprising:

a processor; and a memory having instructions stored thereon that, when executed by the processor, cause the processor to:

receive node-site planning data from a first-party application;

validate the node-site planning data based on one or more parameters of validation;

pre-load at least a portion of the node-site planning data on a second-party application for field-survey data gathering;

receive field-survey data from the second-party application;

synchronize at least a portion of the node-site planning data from the first-party application with the field-survey data from the second-party application; and store synchronized data in a centralized database.

10. The apparatus of claim 9, wherein the instructions further cause the processor to:

create a node-site based on the node-site planning data; and store the node-site or the node-site planning data in the centralized database.

11. The apparatus of claim 9, wherein the instructions further cause the processor to:

validate the field-survey data from the second-party application based on the one or more parameters of validation.

12. The apparatus of claim 11, wherein the instructions further cause the processor to:

in response to a failed validation of the field-survey data, send communication to a first-party that describes the failed validation.

13. The apparatus of claim 11, wherein the instructions further cause the processor to:

in response to a successful validation of the field-survey data, send an update of the node-site planning data to the first-party application, the node-site planning data being updated based upon the received field-survey data.

14. The apparatus of claim 9, wherein the instructions further cause the processor to:

before the receiving of the node-site planning data from the first-party application; send a session-token request to the first party application.

15. The apparatus of claim 14, wherein the instructions further cause the processor to:

receive a valid token response from the first-party application; or receive an invalid token response from the first-party application.

16. The apparatus of claim 15, wherein the instructions further cause the processor to:

in response to the receiving the valid token response from the first-party application, send a request for the node-site planning data from the first-party application.

17. A non-transitory computer readable medium having instructions stored thereon that, when executed by a processor, cause the processor to:

receive node-site planning data from a first-party application;

validate the node-site planning data based on one or more parameters of validation;

pre-load at least a portion of the node-site planning data on a second-party application for field-survey data gathering;

receive field-survey data from the second-party application;

synchronize at least a portion of the node-site planning data from the first-party application with the field-survey data from the second-party application; and store synchronized data in a centralized database.

18. The non-transitory computer readable medium of claim 17, wherein the instructions further cause the processor to:

create a node-site based on the node-site planning data; and store the node-site or the node-site planning data in the centralized database.

19. The non-transitory computer readable medium of claim 17, wherein the instructions further cause the processor to:

validate the field-survey data from the second-party application based on the one or more parameters of validation.

20. The non-transitory computer readable medium of claim 19, wherein the instructions further cause the processor to:

in response to a failed validation of the field-survey data, send communication to a first-party that describes the failed validation.

* * * * *